US006979795B1

(12) United States Patent
Kaneko et al.

(10) Patent No.: US 6,979,795 B1
(45) Date of Patent: Dec. 27, 2005

(54) SINKER ELECTRIC DISCHARGE MACHINE JUMP CONTROL DEVICE

(75) Inventors: Yuji Kaneko, San Jose, CA (US); Koji Yoneda, San Jose, CA (US)

(73) Assignees: Sodick Co., Ltd., Yokohama (JP); Sodick America Corporation, San Jose, CA (US)

( * ) Notice: Subject to any disclaimer, the term of this patent is extended or adjusted under 35 U.S.C. 154(b) by 0 days.

(21) Appl. No.: 11/082,969

(22) Filed: Mar. 18, 2005

(51) Int. Cl.[7] .......................... B23H 1/02; B23H 7/18; G05B 19/19

(52) U.S. Cl. .................................. 219/69.16; 318/571

(58) Field of Search .......................... 219/69.16, 69.2; 318/569, 571, 600

(56) References Cited

U.S. PATENT DOCUMENTS

| | | | | |
|---|---|---|---|---|
| 4,667,079 | A * | 5/1987 | Matsumura et al. | 219/69.16 |
| 5,313,147 | A * | 5/1994 | Yoneda et al. | 318/569 |
| 5,973,498 | A | 10/1999 | Imai et al. | |
| 6,339,203 | B1 * | 1/2002 | Nakamura et al. | 219/69.2 |
| 6,608,275 | B1 | 8/2003 | Nakagawa et al. | |

FOREIGN PATENT DOCUMENTS

| | | | |
|---|---|---|---|
| JP | 63-127826 | A * | 5/1988 |
| JP | 4-31806 | | 5/1992 |
| JP | 5-116031 | A * | 5/1993 |
| JP | 2000-084739 | A * | 3/2000 |

* cited by examiner

*Primary Examiner*—Geoffrey S. Evans
(74) *Attorney, Agent, or Firm*—McDermott Will & Emery LLP

(57) ABSTRACT

A sinker electric discharge machine jump control device for reciprocating a tool electrode along a Z-axis with respect to a workpiece using a servo motor in order to expel contaminated fluid from a work gap. The jump control device includes a commanded current generator, the current generator generating a commanded current for the servo motor, and a commanded velocity generator, the velocity generator dividing a locus of a jump stroke into a plurality of segments and generating a commanded velocity for each of the plurality of segments. Additionally, the jump control device includes a velocity override calculator, the calculator generating a velocity override according to the commanded current, and a commanded velocity modifying device, the modifying device modifying the commanded velocity according to the velocity override during the jump stroke.

10 Claims, 2 Drawing Sheets

SINKER ELECTRIC DISCHARGE MACHINE JUMP CONTROL DEVICE

FIELD OF THE INVENTION

The present invention relates generally to an electric discharge machine ("EDM") for machining an electrically conductive workpiece and, in particular, relates to the generation of an electric discharge across a fluid-filled work gap formed between the workpiece and a tool electrode, where the tool electrode is moved rapidly up and down to expel contaminated fluid from the gap.

BACKGROUND OF THE INVENTION

Conventional EDMs are widely used to accurately machine solid conductive workpieces into molds or a dies. Typically, the workpiece is affixed to a table which is arranged in a work tank, and a copper or graphite tool electrode is attached to a vertically movable quill or ram using a tool holder. The work tank is filled with dielectric fluid such as kerosene, and the tool electrode is positioned extremely close to the workpiece. The space between the workpiece and the tool electrode, known as the work gap, typically ranges in size from on the order of a few μm to a few tens of μm.

If, during a power pulse 'on' time, the power pulse is applied across the work gap, the insulation characteristics of the dielectric fluid in the work gap break down and electric discharges occur. At this time, microscopic amounts of the workpiece material are evaporated or become molten due to the heat of the electric discharge, and the liberated material flows into the dielectric fluid. During a power pulse 'off' time, the insulation characteristics of the dielectric fluid in the work gap are restored.

As a result of the electric discharges produced during the power pulse 'on' time, microscopic crater-shaped holes remain in the surface of the workpiece. Conventional EDMs are equipped with a servomotor which causes the tool electrode to move relative to the workpiece along the Z-axis in order to maintain a constant-sized work gap.

Since it is possible to remove microscopic amounts of material from the workpiece without the tool electrode coming into contact with the workpiece, a cavity having good surface roughness and a shape complimentary to that of the tool electrode may be accurately formed in the workpiece. This type of EDM, known as a sinker EDM, is different from conventional wire EDMs, which uses a moving wire electrode.

During the electric discharge machining process, it is beneficial to remove fragments of the workpiece away from the work gap, to prevent these fragments from causing undesirable secondary discharges. Using a "jump" operation, the tool electrode is moved rapidly up and down along the Z-axis, substantially expelling contaminated dielectric fluid from the gap. In one known example of the jump operation, the tool electrode rises up by at least a depth of the cavity being machined in the workpiece. As a depth of the cavity is increased, however, positive and negative pressures acting on the tool electrode during the jump operation are increased, causing the tool electrode to vibrate and become deformed.

Japanese Patent No. 4-31806 is seen to disclose an EDM which alleviates these types of pressures. As shown in FIG. 1, with this conventional EDM, when the tool electrode is separated from the workpiece at a velocity $v_2$ that is lower than the conventional jump velocity $v_1$, and a distance l between the tool electrode and the workpiece reaches $l_1$, the jump velocity is raised from $v_2$ to $v_1$. Additionally, when the tool electrode is moved from the stroke apex P at velocity $v_1$ in the direction of the workpiece so as to approach the workpiece, and when the distance l reaches $l_1$ the jump velocity $v_1$ is lowered to $v_2$. By reducing the jump velocity at the start and end of the stroke, positive negative pressures are alleviated. Since positive negative pressures vary according to size and shape of the tool electrode and size of the work gap, however, variations of the jump velocity using conventional technologies have the potential to cause lowered machining efficiency. Furthermore, in addition to variations in jump velocity, conventional technologies insufficiently alleviate variations in positive and negative pressures.

As such, it is highly desirable to provide an EDM which overcomes the deficiencies of conventional EDMs. In particular, it is desirable to provide an improved EDM which generates an electric discharge across a fluid-filled work gap formed between the workpiece and a tool electrode, where the tool electrode is caused to rapidly rise up and fall down to substantially expel contaminated fluid from the gap.

SUMMARY OF THE INVENTION

The present invention relates generally to an EDM for machining an electrically conductive workpiece and, in particular, relates to the generation of an electric discharge across a fluid-filled work gap formed between the workpiece and a tool electrode, where the tool electrode is moved rapidly up and down to expel contaminated fluid from the gap.

The present invention provides an enhanced sinker EDM including a jump control device capable of causing a tool electrode to reciprocate at an appropriate velocity regardless of the size and shape of a workpiece and the size of a work gap. In particular, the jump control device includes a velocity override calculator for generating a velocity override according to a commanded current for a servo motor.

According to one aspect, the present invention is a sinker EDM jump control device for reciprocating a tool electrode along a Z-axis with respect to a workpiece using a servo motor in order to expel contaminated fluid from a work gap. The jump control device includes a commanded current generator, the current generator generating a commanded current for the servo motor, and a commanded velocity generator, the velocity generator dividing a locus of a jump stroke into a plurality of segments and generating a commanded velocity for each of the plurality of segments. Additionally, the jump control device includes a velocity override calculator, the calculator generating a velocity override according to the commanded current, and a commanded velocity modifying device, the modifying device modifying the commanded velocity according to the velocity override during the jump stroke.

According to a second aspect, the present invention is a sinker EDM. The sinker EDM includes a jump control device for reciprocating a tool electrode along a Z-axis with respect to a workpiece using a servo motor in order to expel contaminated fluid from a work gap. The jump control device includes a commanded current generator, the current generator generating a commanded current for the servo motor, and a commanded velocity generator, the velocity generator dividing a locus of a jump stroke into a plurality of segments and generating a commanded velocity for each of the plurality of segments. Additionally, the jump control device includes a velocity override calculator, the calculator generating a velocity override according to the commanded current, and a commanded velocity modifying device, the modifying device modifying the commanded velocity according to the velocity override during the jump stroke.

In the following description of the preferred embodiment, reference is made to the accompanying drawings that form a part thereof, and in which is shown by way of illustration a specific embodiment in which the invention may be practiced. It is to be understood that other embodiments may be utilized and changes may be made without departing from the scope of the present invention.

BRIEF DESCRIPTION OF THE DRAWINGS

Referring now to the drawings in which like reference numbers represent corresponding parts throughout.

DETAILED DESCRIPTION OF THE INVENTION

Figure 2:
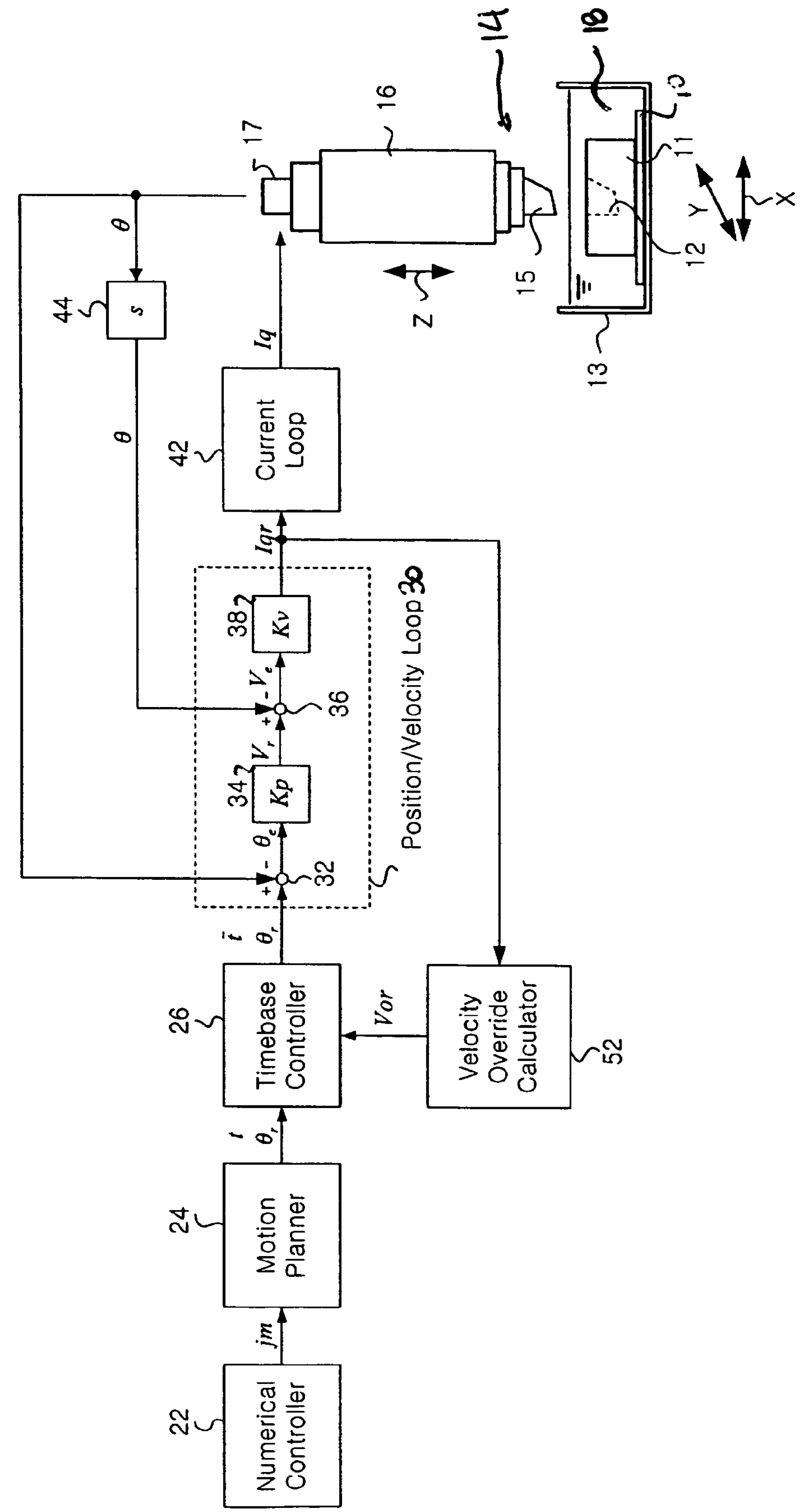
FIG. 2 is a block diagram showing one example of an enhanced jump control device according to the present invention.

FIG. 2 depicts one example of an EDM according to the present invention. Briefly, the EDM includes a jump control device for reciprocating a tool electrode along a Z-axis with respect to a workpiece using a servo motor in order to expel contaminated fluid from a work gap. The jump control device includes a commanded current generator, the current generator generating a commanded current for the servo motor, and a commanded velocity generator, the velocity generator dividing a locus of a jump stroke into a plurality of segments and generating a commanded velocity for each of the plurality of segments. Additionally, the jump control device includes a velocity override calculator, the calculator generating a velocity override according to the commanded current, and a commanded velocity modifying device, the modifying device modifying the commanded velocity according to the velocity override during the jump stroke.

In more detail, workpiece 11 is fixed to table 10 inside work tank 13, and tool electrode 15 is attached to lower end 14 of head 16. Workpiece 11 is immersed in dielectric fluid 18, which is supplied on the inside of work tank 13. Table 10 moves horizontally in the direction of the orthogonal X-Y axes, and servo motor 17 vertically moves head 16 in the direction of Z-axis. Tool electrode 15 is positioned close to workpiece 11 so as to form a work gap on the order of a few $\mu$m to a few tens of $\mu$m.

As a result of the application of power pulses supplied from a power source (not depicted), electrical discharge occurs in the work gap. By repeating the electrical discharge, material from workpiece 11 is removed, allowing tool electrode 15 to be gradually lowered down along the Z-axis. In this manner, cavity 12, which is complementary in shape to tool electrode 15, is formed in workpiece 11.

Numerical controller 22, which is provided with an input device and a display device (both not depicted), decodes a numerical control ("NC") program and an operator s input. Additionally, numerical controller 22 generates various commanded signals, such as signals for controlling a supply of power pulses, a supply of dielectric fluid, and a movement of tool electrode 15. Various feedback signals, such as signals representing the operating state of the machine and the state of workpiece 11, are fed to numerical controller 22.

During machining, a voltage (known as the 'gap voltage') across the work gap is detected, and the average gap voltage is compared to a reference servo voltage stored in numerical controller 22. Numerical controller 22 controls servo motor 17 in response to the comparison result, to maintain the desired size of the work gap. The setting of conditions such as reference servo voltage, current peak, and on-time and off-time of the power pulse is normally changed gradually according to several steps of machining.

With respect to cavity 12 in workpiece 11, rough processing is initially carried out using a relatively higher energy, taking into consideration the material removal rate. Cavity 12 is subjected to finishing processing at a relatively lower energy, taking into consideration surface roughness and dimensional accuracy. If numerical controller 22 determines that debris from workpiece 11 has accumulated excessively in the work gap during processing, jump command jm is sent to motion planner 24, where jump command jm causes tool electrode 15 to perform a jump operation. Jump command jm is generated so that excessive accumulation of debris is resolved, and is generated, for example, every 1 or 2 milliseconds.

Figure 3:
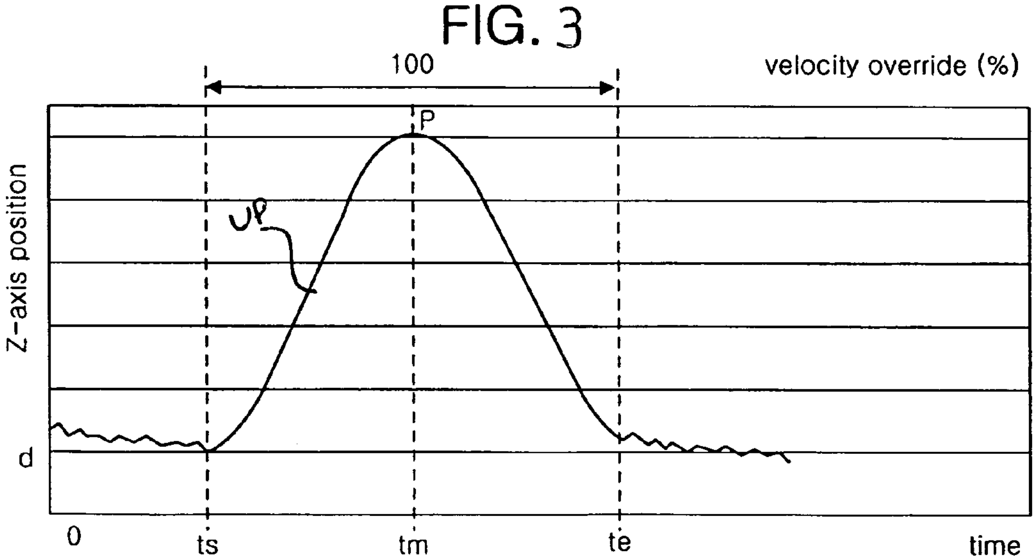
FIG. 3 is a graph in which actual positions of a tool electrode are plotted when a velocity override is changed between 10% and 100%.

Jump command jm includes information, such as information on jump conditions which are first set within the NC program. In one arrangement, the setting of jump conditions can be changed during machining by an operator. The jump conditions include, for example, rise time UP, rest time DN between respective jump strokes, and jump velocity JS. Referring ahead to FIG. 3, rise time UP is a time from the start of the jump at time is to a stroke apex P at time tm, and can normally be set from on the order of ten milliseconds to several seconds.

Stroke apex P is a position where tool electrode 15 attains maximum separation from the workpiece. A time for a single jump stroke is approximately double rise time UP. Although a large rise time UP makes it possible to efficiently remove debris from the work gap, it lowers material removal rate. According to one arrangement, jump velocity JS is set from 1 m/minute to 30 m/minute, although other velocities are contemplated.

Motion planner 24 creates a motion program based on information on jump conditions included in the jump command jm, where the motion program provides an optimum locus as an optimum velocity profile to tool electrode 15. Motion planner 24 divides the locus into a number of segments, and sends commanded position $\theta_r$ and segment time t for each segment to a timebase controller 26. Segment time t is the time required for moving tool electrode 15 or rotating servo motor 17 to commanded position $\theta_r$ at the end of the segment from the start point of the segment. Therefore, commanded position $\theta_r$ and segment time t form a commanded velocity.

Segment time t is set to a time substantially shorter than a time for a jump stroke, for example, 100 $\mu$s. A locus of segment is represented by the cubic curve, expressed below in Equation (1):

$$\theta_r = at^3 + bt^2 + ct + d \quad (1)$$

As a commanded velocity modifying device, timebase controller 26 receives velocity override Vor, and modifies the commanded velocity according to velocity override Vor. In one arrangement, timebase controller 26 modifies the segment time t to modify a commanded velocity, and sends the commanded position $\theta_r$ and the modified segment time $\bar{t}$ to position/velocity loop 30. Actual position θ, which is the position of tool electrode 15 or servo motor 17 detected by an appropriate position sensor, is fed back to subtracter 32. Subtracter 32 receives commanded position $\theta_r$ and determines error $\theta_e$ between commanded position $\theta_r$ and actual position θ.

Multiplier 34 multiplies error $\theta_e$ by gain Kp and sends velocity reference $V_r$ to subtracter 36. Actual velocity $\dot{\theta}$ is fed back to subtracter 36 from differentiator 44, which differentiates actual position θ. Multiplier 38 multiples error $V_e$, which is the error between velocity reference $V_r$ and actual velocity $\dot{\theta}$, by gain Kv, and sends commanded current Iqr to current loop 42. Current loop 42 supplies current Iq for driving servo motor 17, according to commanded current Iqr.

The jump control device of the present invention carries out velocity override control according to commanded current Iqr. Velocity override calculator 52 receives commanded current Iqr and determines velocity override Vor based on an override setting, in real time. The override setting defines the relationship between commanded current Iqr and velocity override Vor, and velocity override Vor is supplied to timebase controller 26. Timebase controller 26 modifies the segment time t so that a commanded velocity is varied according to velocity override Vor. Velocity override Vor is expressed as a percentage, where the maximum is expressed as 100%.

The modified segment time $\bar{t}$ is expressed below in Equation (2):

$$\bar{t}=t\cdot 100/Vor \quad (2)$$

Figure 4:
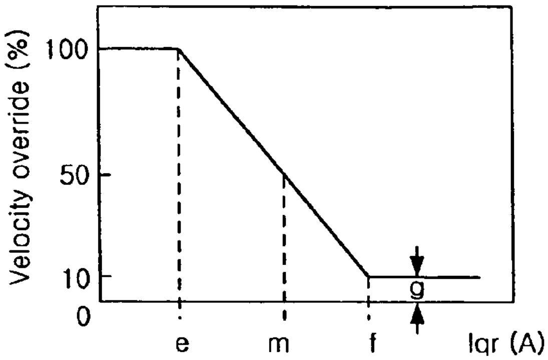
FIG. 4 is a graph showing an example of the override setting.
Figure 1:
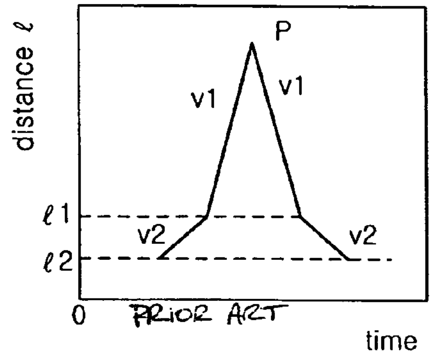
FIG. 1 depicts the actual positions of a tool electrode for a conventional EDM.

The override setting includes, for example, the values e, f and g in FIG. 4. When the commanded current Iqr is smaller than the value e, velocity override Vor is 100. In one arrangement, the value e represents the rated current of servo motor 17, or a value slightly smaller. When commanded current Iqr is larger than the value f, velocity override Vor is value g. Value g is the minimum velocity override Vor, and is set to 10 in the example of FIG. 4. Velocity override Vor reduces from 100 to the value g in proportion to the increase in the commanded current Iqr from value e to value f.

Figure 5:
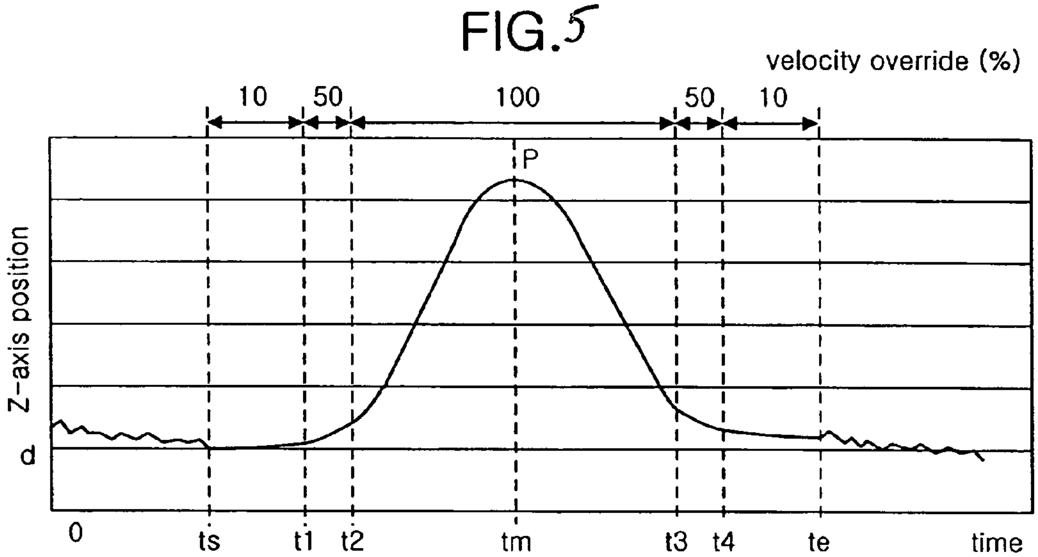
FIG. 5 is a graph in which actual positions of a tool electrode are plotted when a velocity override is maintained at 100%.

In cases where servo motor 17 is not operating during a jump operation due to negative and positive pressures, commanded current Iqr is raised. As shown in FIG. 5, if commanded current Iqr is raised in excess of value f due to negative pressure at the start of jump ts, velocity override Vor becomes 10. If commanded current Iqr at time t1 falls to value m, velocity override Vor becomes 50. If commanded current Iqr at time t2 becomes smaller than value e, velocity override Vor becomes 100, and timebase controller 26 generates a segment time $\bar{t}$ that is equal to the segment time t.

At time tm, tool electrode 15 is separated to the fullest extent from workpiece 111 and, after that, the tool electrode 15 is moved towards workpiece 11. If commanded current Iqr becomes smaller than value m at time t3 because of positive pressure, velocity override Vor becomes 50. If commanded current Iqr is raised further in excess of value fat time t4, velocity override Vor becomes 10. After time te, tool electrode 15 is made to move according to an error between the gap voltage and a reference servo voltage so that the work gap becomes a desired size.

In the event that commanded current Iqr does not exceed value e during a jump operation, velocity override calculator 52 supplies a velocity override of 100 to timebase controller 26 from time ts until time te, as shown in FIG. 3. As a result, the time taken by the jump operation in FIG. 3 is shortened compared to for the jump operation in FIG. 5, improving overall machining efficiency.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A sinker electric discharge machine jump control device for reciprocating a tool electrode along a Z-axis with respect to a workpiece using a servo motor in order to expel contaminated fluid from a work gap, comprising:

- a commanded current generator, said current generator generating a commanded current for the servo motor;
- a commanded velocity generator, said velocity generator dividing a locus of a jump stroke into a plurality of segments and generating a commanded velocity for each of the plurality of segments;
- a velocity override calculator, said calculator generating a velocity override according to the commanded current; and
- a commanded velocity modifying device, said modifying device modifying the commanded velocity according to the velocity override during the jump stroke.

2. The sinker electric discharge machine jump control device according to claim 1, wherein the commanded current is based upon an operating state of the sinker electric discharge machine jump control device.

3. The sinker electric discharge machine jump control device according to claim 1, wherein the commanded current is based upon the work gap size.

4. The sinker electric discharge machine jump control device according to claim 1, wherein said commanded velocity modifying device modifies timing of the plurality of segments to modify the commanded velocity.

5. The sinker electric discharge machine jump control device according to claim 1, wherein said velocity override calculator receives the commanded current and generates the velocity override based on an override setting, in real-time.

6. A sinker electric discharge machine, comprising:

jump control device for reciprocating a tool electrode along a Z-axis with respect to a workpiece using a servo motor in order to expel contaminated fluid from a work gap, said jump control device further comprising:

- a commanded current generator, said current generator generating a commanded current for the servo motor;
- a commanded velocity generator, said velocity generator dividing a locus of a jump stroke into a plurality of segments and generating a commanded velocity for each of the plurality of segments;
- a velocity override calculator, said calculator generating a velocity override according to the commanded current; and
- a commanded velocity modifying device, said modifying device modifying the commanded velocity according to the velocity override during the jump stroke.

7. The sinker electric discharge machine according to claim 6, wherein the commanded current is based upon an operating state of the sinker electric discharge machine jump control device.

8. The sinker electric discharge machine according to claim 6, wherein the commanded current is based upon the work gap size.

9. The sinker electric discharge machine according to claim 6, wherein said commanded velocity modifying device modifies timing of the plurality of segments to modify the commanded velocity.

10. The sinker electric discharge machine according to claim 6, wherein said velocity override calculator receives the commanded current and generates the velocity override based on an override setting, in real-time.

* * * * *

UNITED STATES PATENT AND TRADEMARK OFFICE

CERTIFICATE OF CORRECTION

PATENT NO. : 6,979,795 B1 
APPLICATION NO. : 11/082969
DATED : December 27, 2005
INVENTOR(S) : Yuji Kaneko et al.

It is certified that error appears in the above-identified patent and that said Letters Patent is hereby corrected as shown below:

<u>Column 5,</u>
Line 61, “111” should read -- 11 --.

Signed and Sealed this

Twenty-seventh Day of June, 2006

JON W. DUDAS
*Director of the United States Patent and Trademark Office*